No. 840,647. PATENTED JAN. 8, 1907.
M. F. NEWSOM.
RAKE HEAD.
APPLICATION FILED MAR. 28, 1906.
2 SHEETS—SHEET 1.
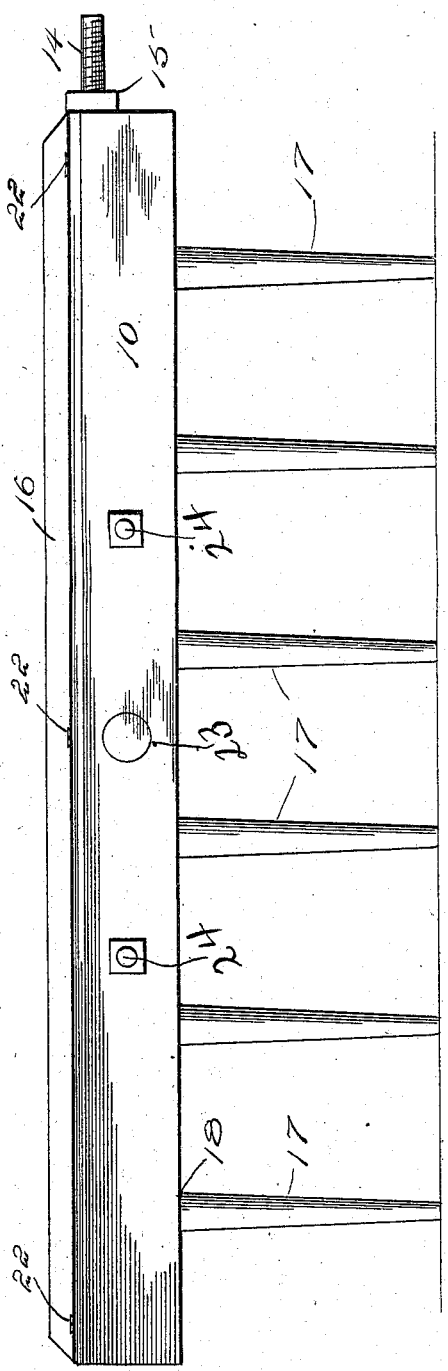
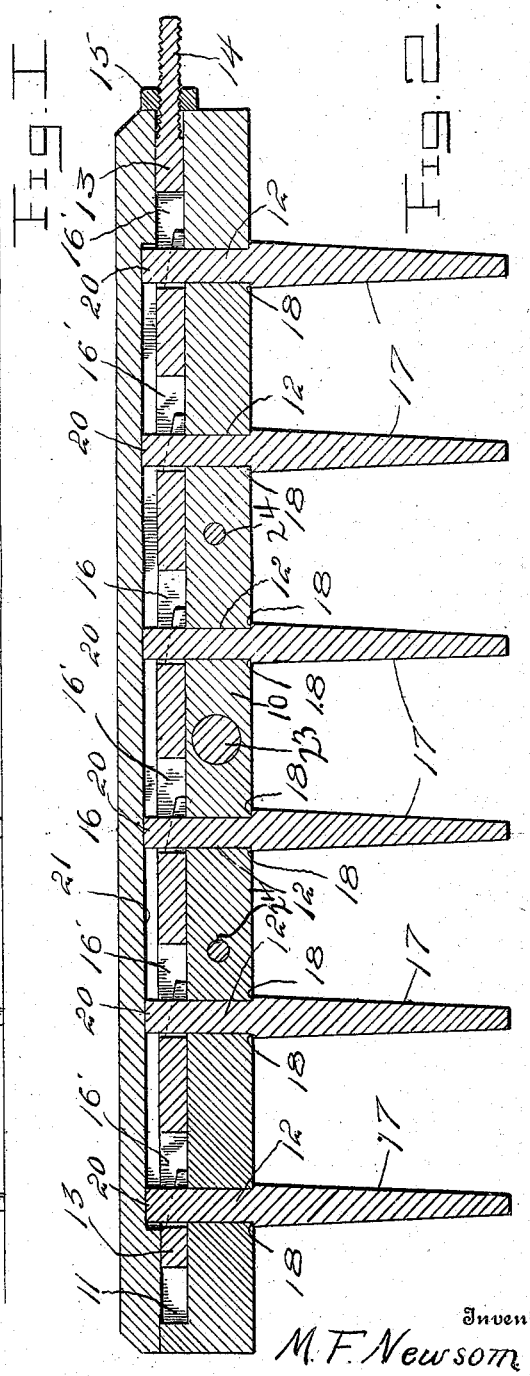
Witnesses
J. C. Simpson
J. C. Jones
Inventor
M. F. Newsom
By Chandler & Chandler
Attorneys No. 840,647. PATENTED JAN. 8, 1907.
M. F. NEWSOM.
RAKE HEAD.
APPLICATION FILED MAR. 28, 1906.
2 SHEETS—SHEET 2.
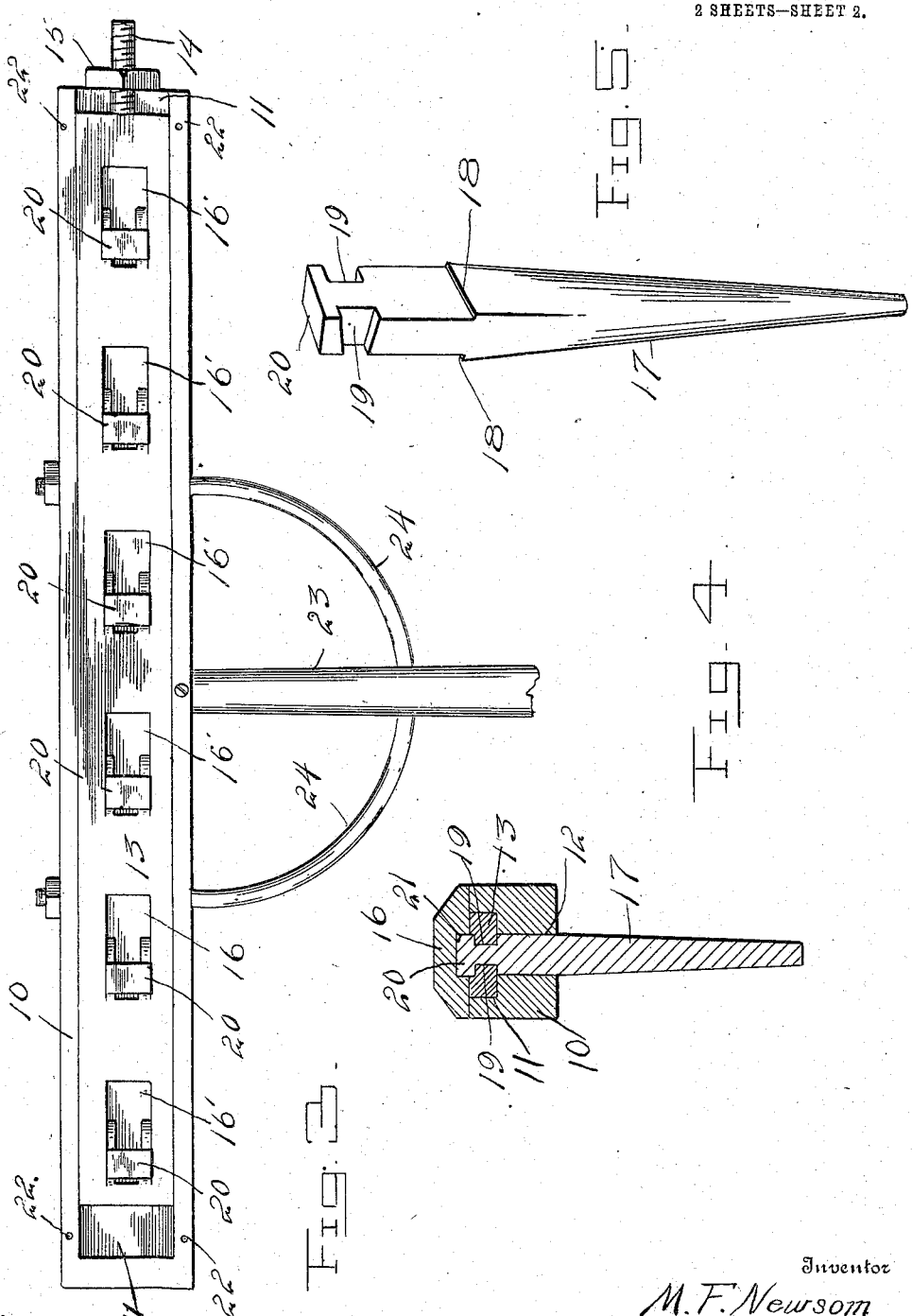
Witnesses
J. C. Simpson
J. C. Jones
Inventor
M. F. Newsom
By 
Attorneys

UNITED STATES PATENT OFFICE.

MILLARD F. NEWSOM, OF CROSS CUT, TEXAS.

RAKE-HEAD.

No. 840,647.     Specification of Letters Patent.     Patented Jan. 8, 1907.

Application filed March 28, 1906. Serial No. 308,541.

*To all whom it may concern:*

Be it known that I, MILLARD F. NEWSOM, a citizen of the United States, residing at Cross Cut, in the county of Brown, State of Texas, have invented certain new and useful Improvements in Rake-Heads; and I do hereby declare the following to be a full, clear, and exact description of the invention, such as will enable others skilled in the art to which it appertains to make and use the same.

This invention relates to rake-heads, and has for its object to provide a head of novel construction having removable teeth and including means for securely holding the teeth in the head, the said means being movable to simultaneously release the teeth from the head.

The construction contemplated in the present invention includes a rake-head the teeth of which are headed and have the under sides of their heads inclined and a locking-plate slotted for the reception of the head and designed for engagement with the under sides of the said head to securely lock the teeth in position.

In the accompanying drawings, Figure 1 is a perspective view of the rake-head. Fig. 2 is a vertical longitudinal section. Fig. 3 is a top plan view with the top plate removed. Fig. 4 is a transverse section through the rake-head including one of the teeth. Fig. 5 is a detail perspective view of one of the teeth.

Referring to the drawings, the rake-head comprises a bar 10, which has its upper face provided with a recess 11, which opens through one end of the bar, the said bar being provided also with a series of openings 12, which open through the under side of the bar and into the said recess 11.

Slidably disposed in the recess 11 in the bar 10 is a locking-plate 13, which is of less length than the said recess and which is provided at its end adjacent the end of the bar through which the recess opens with an integral screw-threaded stem 14, upon which is engaged an adjusting-nut 15, which abuts against the said end of the bar and the corresponding end of a top 16, which is removably secured upon the upper face of the said bar, the said nut serving to adjust the locking-plate 13 longitudinally in the recess 11, for a purpose to be hereinafter described. The plate 13 is provided throughout its length with a series of keyhole-slots 16', the edges of the reduced portion of each slot having their upper faces inclined upwardly in a direction from that end of the plate at which the stem 14 is located. Engaged through each of the openings 12 in the bar 10 is a tooth 17, which is shouldered upon opposite sides, as at 18, to limit its upward movement through the said opening and which is recessed upon opposite sides, as at 19, adjacent its upper end, the said recesses forming a head 20 at the upper end of each tooth. The under side of each head 20 is inclined in a common plane with the corresponding edges of the reduced portion of the related slots 16' and are designed for engagement thereby to wedge beneath the said head upon each of the teeth and securely hold them in position in the head 10.

From the foregoing it will be readily understood that by turning the nut 15 upon the threaded stem 14 after the teeth have been inserted with their upper ends through the openings 12 in the bar 10 the plate 13 will be moved toward the end of the bar 10, through which the recess 11 opens, resulting in the engagement of the edges of the reduced portion of each slot 16' with the under side of the head 20 of the corresponding tooth, thereby drawing the said teeth in an upward direction and causing their shoulders 18 to firmly engage the under side of the bar 10. It will be understood, of course, that by turning the nut from the stem 14 the plate 13 may be moved to a position to release the teeth 17 to permit their removal for repair or replacement.

The cover 16 is provided in its under face with a recess 21, which receives the heads 20 of the teeth 17, and the said cover is secured upon the said bar 10 by means of screws or bolts 22. A handle 23 is provided with diverging arms 24, which are secured in any suitable manner to the bar 10, as will be understood.

What is claimed is—

1. A device of the class described comprising a bar, a plate slidably mounted upon the bar, a series of headed teeth engaged through openings in said bar, and means carried by the plate for engagement with said heads to prevent removal of said teeth.

2. A device of the class described comprising a bar, a series of headed teeth engaged through openings in said bar, and a plate adjustably disposed upon said bar and having portions arranged for engagement with the heads on said teeth.

3. A device of the class described comprising a bar having a series of headed teeth engaged through openings therein, and a plate having wedge portions arranged for engagement beneath said heads on said teeth.

4. A device of the class described comprising a bar having openings formed therethrough, teeth engaged through said openings, said teeth being provided at their upper ends with heads and intermediate their ends with shoulders, said shoulders being arranged to abut against the under side of said bar, and a plate adjustably disposed upon said bar and having wedge portions arranged for engagement with the under side of said heads.

5. A device of the class described comprising a bar having openings formed therethrough, teeth engaged in said openings and having recesses formed upon opposite sides, and a plate adjustably disposed upon said bar and provided with keyhole-slots, the edges of the reduced portions of said slots being arranged for engagement in the said recesses.

6. A device of the class described comprising a bar having a series of openings formed therethrough, teeth engaged in said openings and having recesses formed in opposite sides thereof, and a plate adjustably disposed upon said bar, said plate being provided with a series of keyhole-slots, the edges of the reduced portions of said slots being wedge-shaped and being arranged for engagement in said recesses.

7. A device of the class described comprising a bar having a series of openings formed therethrough, a plate adjustably disposed upon the bar and provided with a series of keyhole-slots, headed teeth engaged through the openings in said bar and through said keyhole-slots and means for adjusting the plate to cause the same to engage the heads of the teeth.

8. A device of the class described comprising a bar having a series of openings formed therethrough, a plate adjustably disposed upon said bar and having keyhole-slots formed therethrough, headed teeth engaged through said openings and said slots, said teeth having the under sides of their heads inclined and means for adjusting the plate to cause the same to engage the heads of the teeth.

9. A device of the class described comprising a bar having openings formed therethrough, teeth engaged through said openings, heads formed on the upper ends of said teeth, a plate disposed upon said bar and having portions arranged for engagement beneath said heads, and means connected with the plate and coöperating with the bar for adjusting the said plate thereon.

10. A device of the class described comprising a bar provided with a series of openings, headed teeth engaged through said openings, a plate disposed upon said bar and having portions arranged for engagement beneath the heads formed on said teeth, a threaded stem formed integral with the plate, and a nut engaged upon the stem and abutting against one end of the bar.

In testimony whereof I affix my signature in presence of two witnesses.

MILLARD F. NEWSOM.

Witnesses:
S. I. HANTO,
T. J. CLARK.